Oct. 20, 1942.  B. C. MITCHELL  2,299,701
VENETIAN BLIND ATTACHMENT
Filed Jan. 21, 1941  2 Sheets-Sheet 1
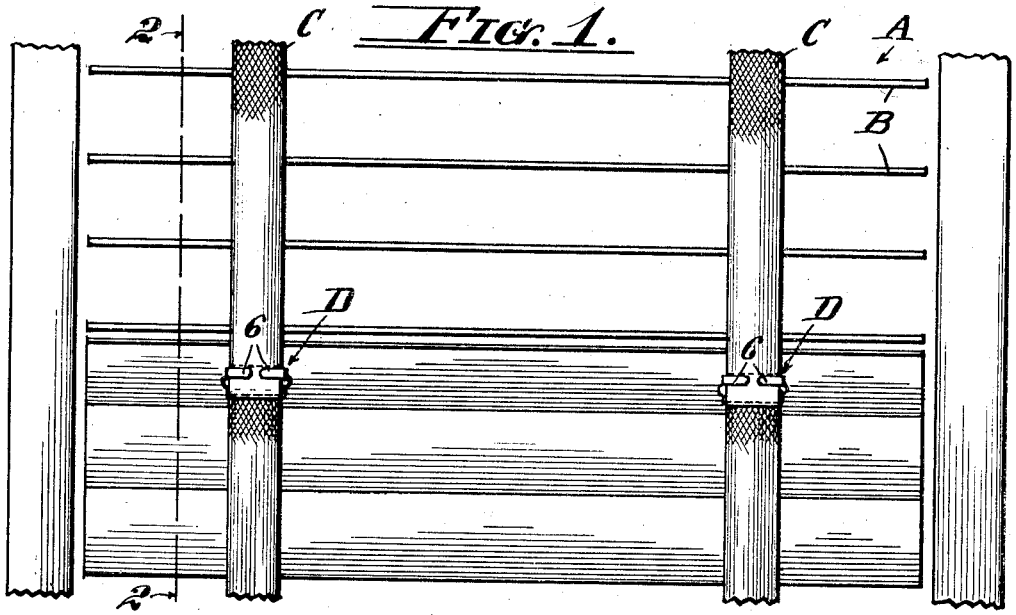
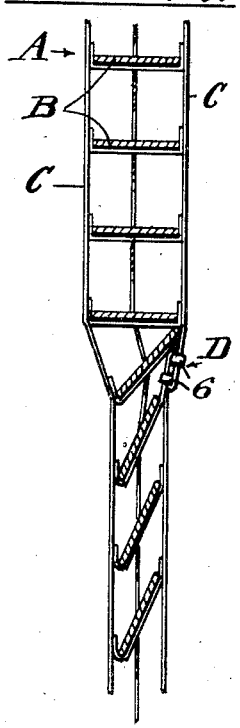
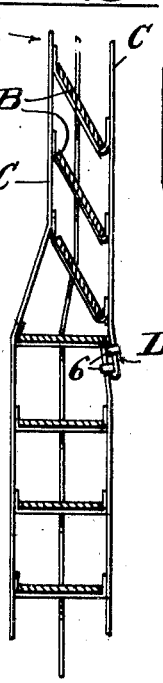
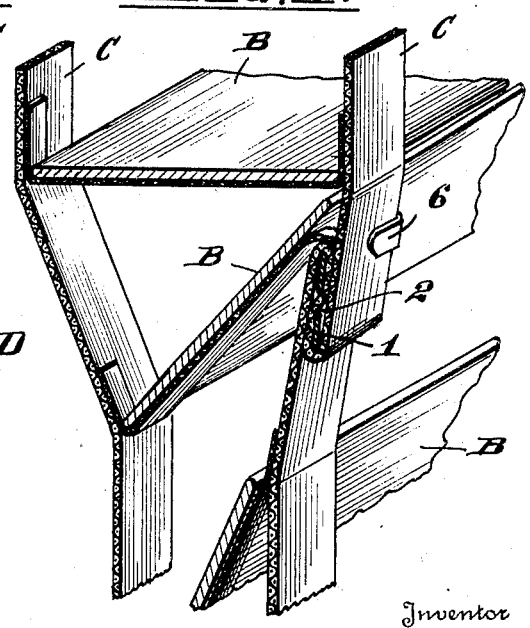
Inventor
Bernard C. Mitchell;

Oct. 20, 1942.   B. C. MITCHELL   2,299,701
VENETIAN BLIND ATTACHMENT
Filed Jan. 21, 1941   2 Sheets-Sheet 2
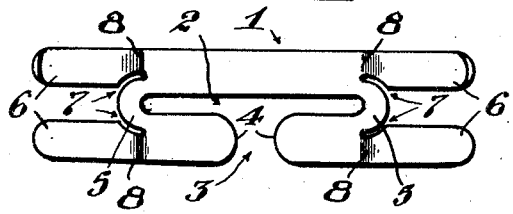
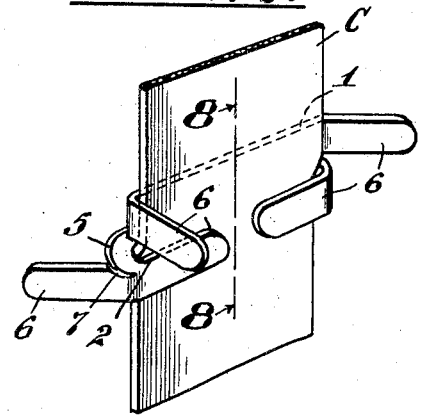
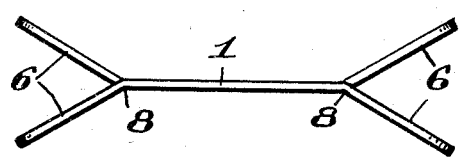
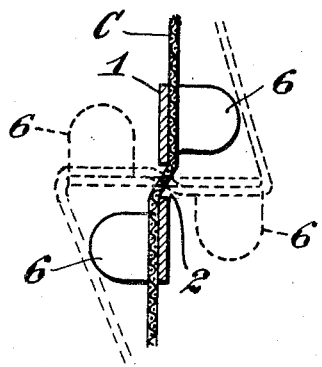
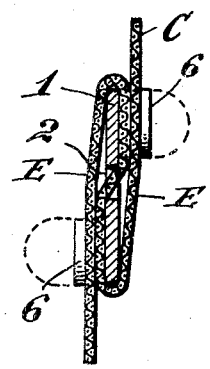
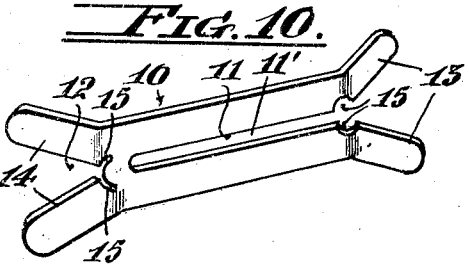
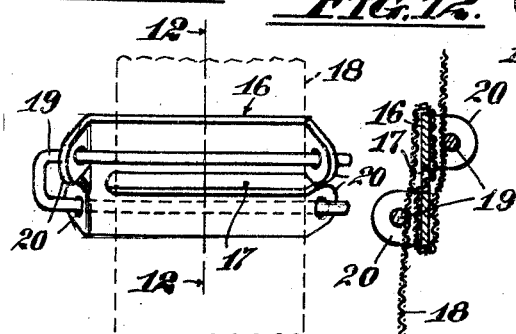
Inventor
Bernard C. Mitchell;
By R. S. Berry
Attorney Patented Oct. 20, 1942

2,299,701

UNITED STATES PATENT OFFICE 2,299,701

VENETIAN BLIND ATTACHMENT

Bernard C. Mitchell, Los Angeles, Calif., assignor of one-third to Alan Hale and one-third to Thomas D. Corcoran, both of Los Angeles, Calif.

Application January 21, 1941, Serial No. 375,225

8 Claims. (Cl. 160—115)

This invention has for its primary object the provision of a simple and inexpensive attachment in the form of clips which may be readily and easily detachably mounted at desired points on the slat supporting tapes of a Venetian blind and as readily and easily manipulated thereon to form and maintain even, flat folds in the tapes so as to set the slats above and below the attachment in different relative positions whereby, for example, the slats above the attachment will be open when the slats below are closed and vice versa.

Another object is to provide Venetian blind modifying or adjusting clips of the character described which may be readily applied to the inner or outer sets of slat supporting tapes so that if it is desired to have the slats below the clips assume an outwardly inclined position when closed and the slats above the clips lie in an inwardly inclined position when closed, the clips are applied to the inner tapes, whereas when it is desired to have the slats above the clips lie in an outwardly inclined position when closed and the lower slats lie in an inwardly inclined position when closed, the clips are attached to the outer tapes. This is important when it is understood that the best light excluding or closing position of a Venetian blind, particularly as to sunlight or light shining downwardly, is with the slats outwardly inclined when closed, yet there may be conditions under which the alternate closing position would be preferable as to either the upper or lower slats and the application of the clips to front or rear tapes makes it possible to set the slats to best suit the condition at hand and the particular user.

Another object of my invention is to provide a clip of the character described which is in the form of a small elongated and thin plate-like body having along the approximate longitudinal median line thereof a tape receiving slot, and adapted to be turned or rotated through 180 degrees of arc about said slot as a horizontal axis, to form straight flat folds in the tape with the folded portions enclosing the clip for the most part, and lying parallel with the tape and the clip, and subject to being maintained by an encompassing fastening means. The fastening means may be carried by the body in the form of tongues bendable to clamp the folds or applied as a separate element like a clasp, to lie on the outer sides of and clamp the folds. The disposition of the tape receiving slot along the longitudinal center of the clip provides for the forming of flat and even folds by simply turning the clip through 180 degrees of arc when the tape is mounted in said slot and makes it easier to fasten or clamp the folds to prevent slipping of the tape or unfolding thereof relative to the clip.

A further object of my invention is to provide a clip of the character described which may be inexpensively made from sheet metal stock in one piece having bendable clamping tongues for securely but detachably holding the clip in operative position with the tape folded thereon.

Yet another object is to provide a clip such as described which is produced in flat form with the tongues subject to being bent into clamping or fold retaining position on the tape to which the clip is attached, said tongues being so formed that they will bend at points in alignment with the ends of the tape receiving slot to insure an accurate setting and fastening of the clip on the tape without forming an uneven or bulky fold or causing the slats of the blind to be tilted out of horizontal position.

With the foregoing objects in view, together with such other objects and advantages as may subsequently appear, the invention is carried into effect as illustrated by way of example in the accompanying drawings, in which:

Fig. 1 is a fragmentary elevational view of a Venetian blind equipped with the attachment of my invention, looking at the inner side of the blind;

Fig. 2 is a sectional view on the line 2—2 of Fig. 1 showing the slats above the attachment open and the lower slats closed;

Fig. 3 is a sectional view on the line 2—2 of Fig. 1 showing the lower slats open and the upper slats closed;

Fig. 4 is a fragmentary enlarged perspective view of a part of a Venetian blind partly in section and showing the manner of attaching one of the clips to a slat supporting tape;

Fig. 5 is an elevational view of one of the clips;

Fig. 6 is a top plan view of the clip shown in Fig. 5;

Fig. 7 is a perspective view showing the manner of initially applying the clip to the tape;

Fig. 8 is a sectional view taken on the line 8—8 of Fig. 7 indicating in dotted lines the manner in which the clip is turned to form the folds in the tape;

Fig. 9 is a sectional view similar to Fig. 8 showing the condition after forming the folds and the manner in which the second pair of tongues are bent to complete the attachment of the clip;

Figs. 10 and 11 are perspective views of modified forms of my invention;

Fig. 12 is a cross section on the line 12—12 of Fig. 11.

Referring more specifically to the accompanying drawings, and particularly to Figs. 1 to 4 inclusive, A designates a standard Venetian blind having the usual slats B and tapes C, to a pair of which latter a pair of clips D embodying my invention is attached in order to modify the operation of the blind as herein described.

Each clip comprises an elongated flat and thin body of sheet metal or any other suitably stiff or rigid material, said body as here shown being substantially rectangular.

Inasmuch as the body 1 is designed to be applied to the tape and then turned on a horizontal axis through at least approximately 180 degrees of arc for the purpose of snubbing the tape by making, as shown in Figs. 8 and 9, the flat folds E thereon, or in other words, folding the tape back on itself, a tape receiving slot 2 is formed on the body to extend longitudinally and preferably along the longitudinal median line thereof.

To provide for insertion of the tape, the slot 2 is open at a margin of the body, preferably centrally of the ends of one longitudinal margin as by means of the slot or opening 3 extending at right angles to and intersecting slot 2. The sides of the slot or opening 3 are rounded as at 4 to facilitate a ready insertion of the tape into the slot 2.

In order to provide the desired strength in a small thin metal body having a length substantially no greater than that of the slot, or in other words, the width of the tape, whereby to as nearly as possible conceal the clip, the body is formed at its ends with small ear like extensions 5 into which the end portions of the slot 2 extend.

Means is provided for clamping the folds E on the body to prevent slipping or unfolding of the tape relative to the body and to hold the folds flat against the body and parallel to the plane of the tape in compact form. As shown in Figs. 1 to 9 inclusive, this clamping means takes the form of bendable tongues 6 provided in pairs at and formed integral with the ends of the body. Each pair has one of the extensions 5 lying therebetween in spaced relation thereto in order that these tongues 6 will bend uniformly at given points, which are in line with the ends of the slot 2. This uniform bending is provided for primarily by means of kerfs or elongated and curved slots 7 formed in the tongues at the junctures thereof with the body 1, and opposite the projections 5 in line with ends of the slot 2. The kerfs or slots 7 form lines of weakness or fold lines indicated by dotted lines 8 which are in line with the ends of the slot 2 and define the actual ends of the body portion 1 and insure a uniform bending of the tongues at given points to avoid bulkiness and unevenness or a loose attachment of the clip.

The initial operation in applying a clip requires the insertion of one of the tapes in the slot 2 and the positioning of the clip as shown in Fig. 7 at the desired point following which certain of the bendable tongues 6 are bent to clamp the tape against opposite sides of the body of the clip.

Next the body 1 is turned or rotated through 180 degrees of arc as indicated by the dotted lines in Fig. 8 into position shown in Fig. 9 so as to form the folds E and following this the other tongues are bent as shown in full lines in Fig. 9 to lie over and clamp the outer folds to opposite sides of the body 1, thereby completing the operation as to one tape. The other tape is then snubbed by means of another clip at the corresponding position and the blind is then set as shown in Fig. 1 for the operations and adjustments shown in Figs. 2 and 3 and described herewith.

A modified form of clip embodying my invention as shown in Fig. 10 includes an elongated flat body 10 of sheet metal or other suitable material formed with aligned but axially spaced slots 11 and 12 along the longitudinal median line thereof. The slot 11 extends approximately three-fourths of the length of the body and opens at one end thereof so as to receive in the inner part 11' thereof, a Venetian blind tape. The slot 11 also defines at the end of the body at which it opens, a pair of bendable tongues 13 which are set to extend divergently from the body proper. The slot 12 opens at the other end of the body and there defines a pair of bendable tongues 14 which extend divergently like the tongues 13.

This form of clip is applied to the tape so that the tape lies in inner portion 11' of the slot 11 after which certain of the tongues 13 and 14 are bent to clamp the tape on the body and vice versa. The body is now turned to form the folds as in the other form of my invention and the other tongues are bent to clamp the folds. Kerfs or notches 15 may be formed in the tongues 13 and 14 to define lines of weakness on bending points.

Referring to Figs. 11 and 12, another form of my invention comprises a flat elongated body 16 having slot 17 formed on the longitudinal median line and opening at one end thereof for receiving a tape as indicated by dotted lines 18. After insertion of the tape the body is turned to fold the tape in the same manner as with the form of my invention shown in Figs. 1 to 9 inclusive. After forming the folds a U-shaped clamp 19 is inserted through apertured ears 20 formed on the ends of the body, so that the legs of said clamp lie upon and clamp the folds on opposite sides of the body. It should be noted that two of the ears 20 extend angularly outwardly from one side of the body and lie in a common horizontal plane, while the other ears extend in the opposite direction outwardly from the other side of said body and lie in another common horizontal plane whereby the two legs of the U-shaped clamp may be inserted through the apertures in said ears when the clamp straddles the body. The angular disposition of the ears sets up sufficient friction on the clamp to hold it in place.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. A Venetian blind attachment comprising a flat elongated body having along the approximate longitudinal median line thereof a slot for receiving the slat supporting tape of a Venetian blind, with said slot opening at a margin of the body to permit of insertion of the tape into the slot, said body after inserting the tape in said slot being adapted to be turned about said slot as an axis to form flat folds in the tape with the folds encompassing substantially the entire body, and means on said body for clamping the folds against and maintaining them on said body.

2. A Venetian blind attachment comprising a flat elongated body having a slot extending longitudinally thereof for reception of a slat supporting tape of a Venetian blind and adapted to be turned about a horizontal axis to form folds in the tape encompassing and lying against the flat faces of the body, and means for clamping said folds against and maintaining them on said body, including tongues carried by and bendable on said body to overlie the folds on opposite sides of the body.

3. A Venetian blind attachment comprising a flat elongated body having a slot extending longitudinally thereof for reception of a slat supporting tape of a Venetian blind and adapted to be turned about said slot as an axis through approximately 180 degrees of arc to form folds in the tape encompassing and lying against the flat faces of the body, and means for clamping said folds against and maintaining them on said body, including clamping members on opposite sides of said body and overlying the folded portions of the tape to hold the body and folded portions in vertical planes parallel with the plane of the tape.

4. In an attachment for Venetian blinds, a substantially flat elongated body having a slot opening at a margin thereof for receiving the tape of a Venetian blind whereby upon turning the body through approximately 180 degrees of arc on a horizontal axis, the tape will be folded with the folds lying on and parallel with the opposite sides of the body, and means at the ends of the body for clamping said folds upon said body and holding the body and folds in planes substantially parallel with the plane of said tape, said slot opening at an end of said body.

5. In an attachment for Venetian blinds, a substantially flat elongated body having a slot opening at a margin thereof for receiving the tape of a Venetian blind whereby upon turning the body through approximately 180 degrees of arc on a horizontal axis, the tape will be folded with the folds lying on and parallel with the opposite sides of the body, and mean at the ends of the body for clamping said folds upon said body and holding the body and folds in planes substantially parallel with the plane of said tape, said body having a slot intersecting the tape receiving slot and opening at a longitudinal edge of said body to permit of insertion of said tape in the tape receiving slot.

6. In an attachment for Venetian blinds, a substantially flat elongated body having a slot opening at a margin thereof for receiving the tape of a Venetian blind whereby upon turning the body through approximately 180 degrees of arc on a horizontal axis, the tape will be folded with the folds lying on and parallel with the opposite sides of the body, and means for clamping said folds upon said body and holding the body and folds in planes substantially parallel with the plane of said tape, including tongues projecting outwardly at the ends of said body and bendable to overlie said folds and opposite sides of the body, said tongues having slots extending therein from edges thereof at points in line with the ends of said slot for defining lines of weakness on which said tongues are foldable.

7. In an attachment for Venetian blinds, a substantially flat elongated body having a slot opening at a margin thereof for receiving the tape of a Venetian blind whereby upon turning the body through approximately 180 degrees of arc on a horizontal axis, the tape will be folded with the folds lying on and parallel with the opposite sides of the body, and means for clamping said folds upon said body and holding the body and folds in planes substantially parallel with the plane of said tape, including apertured ears on the ends of said body and a U-shaped clasp adapted to straddle said body in engagement with the folds and slidably mounted in the apertures of said ears.

8. In an attachment for Venetian blinds, a substantially flat elongated body having a slot opening at a margin thereof for receiving the tape of a Venetian blind whereby upon turning the body through approximately 180 degrees of arc on a horizontal axis, the tape will be folded with the folds lying on and parallel with the opposite sides of the body, and means for clamping said folds upon said body and holding the body and folds in planes substantially parallel with the plane of said tape, including a clasp detachably mounted on and embracing opposite sides of said body.

BERNARD C. MITCHELL.